United States Patent [19]
Wang

[11] Patent Number: 5,584,423
[45] Date of Patent: Dec. 17, 1996

[54] FASTENING DEVICE FOR MOBILE PHONES

[76] Inventor: Chin-Yang Wang, No. 167, Lane 131, Sec. 2, Ture Hsing Rd., Panchiao City, Taipei Hsien, Taiwan

[21] Appl. No.: 579,286

[22] Filed: Dec. 27, 1995

[51] Int. Cl.⁶ .................................................. B65D 25/52
[52] U.S. Cl. .......................... 224/197; 224/666; 224/668; 224/678; 224/269; 224/272; 224/930; 24/3.12; D3/218
[58] Field of Search ..................................... 224/197, 198, 224/666, 668, 669, 670, 671, 672, 674, 269, 930, 272, 678, 676, 272; 24/3.11, 3.12, 669, 702; D3/218

[56] References Cited

U.S. PATENT DOCUMENTS

| | | | |
|---|---|---|---|
| 4,419,794 | 12/1983 | Horton, Jr. et al. | 24/669 |
| 4,485,946 | 12/1984 | Liautaud et al. | 224/197 |
| 5,054,170 | 10/1991 | Otrusina | 224/272 |
| 5,081,709 | 1/1992 | Benyo et al. | 224/669 |
| 5,261,122 | 11/1993 | Otsuki et al. | 224/670 |
| 5,540,368 | 7/1996 | Oliva | 224/930 |

*Primary Examiner*—Henry J. Recla
*Assistant Examiner*—Gregory M. Vidovich
*Attorney, Agent, or Firm*—Bacon & Thomas

[57] ABSTRACT

A fastening device for mobile phones includes a mounting plate, a fastening plate and a mounting frame. The mounting plate has one side thereof provided a pair of mounting rails defining a mounting track therebetween and the other side thereof provided with a pair of fastening strips defining a track therebetween. The fastening plate is slightly curved and has a substantially T-shaped fastening rib for insertion into the mounting track. The mounting frame consists of a frame with a through hole; a circular post is provided on a rear side of the frame and is further connected to a circular plate of a larger diameter. The circular plate may fit into the track between the fastening strips so that the mounting frame may turn relative to the mounting plate.

2 Claims, 3 Drawing Sheets

FASTENING DEVICE FOR MOBILE PHONES

BACKGROUND OF THE INVENTION (a) Field of the Invention

The present invention relates generally to a fastening device for mobile phones, and more particularly to a fastening means for mobile phones, which may be attached to the user's belt without causing discomfort thereto.

(b) Description of the Prior Art

Mobile phones are very popular today. In their earliest development, mobile phones were without any protective outer covering so that they had to be hand-carried or placed inside hand-bags or shoulder-bags. Protective coverings such as leather jackets later appeared on the market; however, users still had to carry them by hand or in bags. Although manufacturers have developed a kind of mobile phone jacket with a clip-like fastening device for attaching the mobile phone to the user's belt to eliminate the need to carry the mobile phone by hand or in bags, there is a major drawback in the conventional fastening device. That is, when the mobile phone is attached to the user's belt by means of the fastening device, it may abut against the user's thigh when the user is seated, especially during driving.

SUMMARY OF THE INVENTION

Accordingly, a primary object of the present invention is to provide a fastening device for mobile phones to eliminate the drawback in the prior art.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
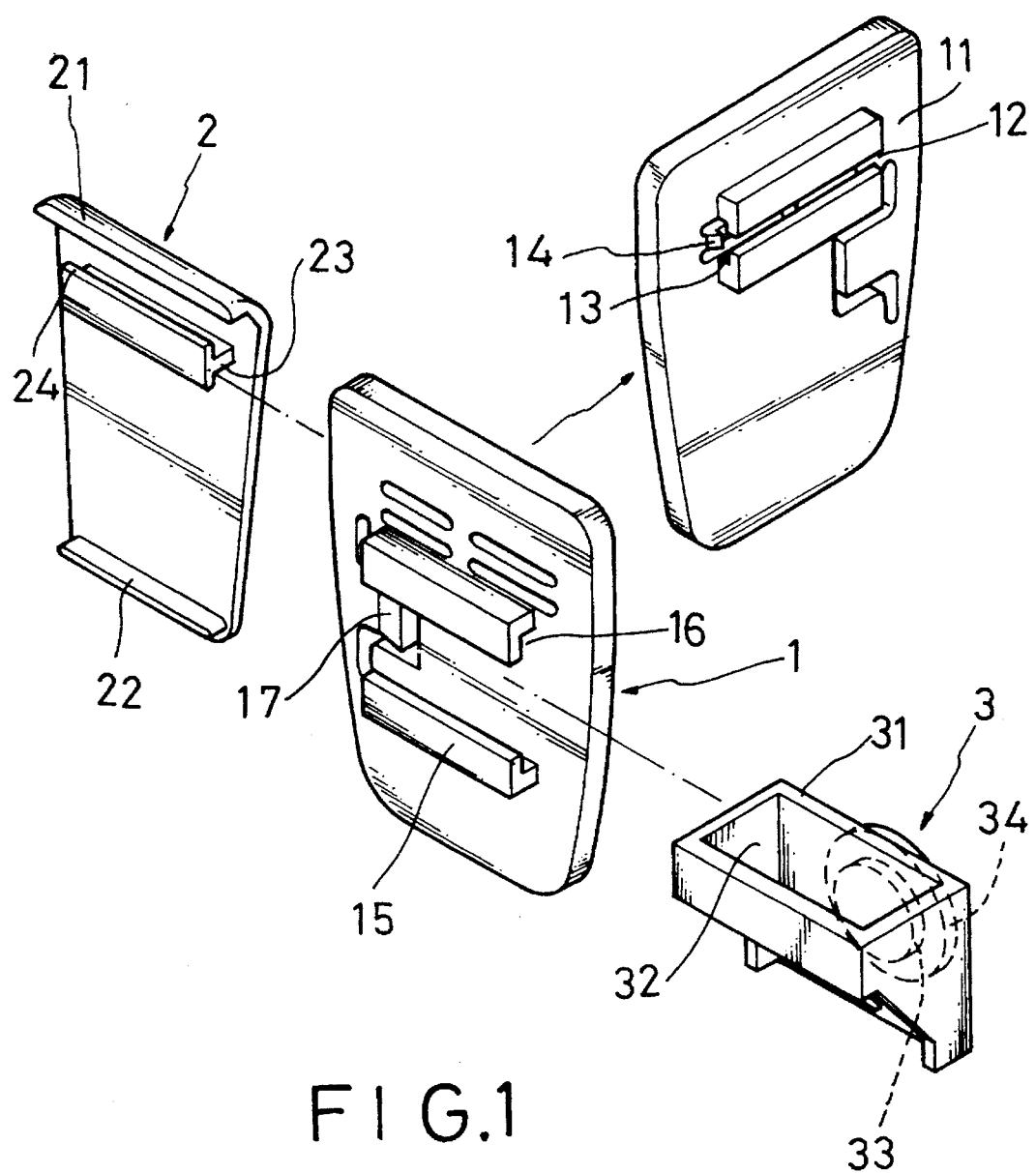
FIG. 1 is an elevational exploded view of the fastening device according to the present invention.

With reference to FIG. 1, a preferred embodiment of the fastening device for mobile phones according to the present invention essentially comprises a mounting plate 1, fastening plate 2, and a mounting frame 3.

As shown in FIG. 1, the mounting plate 1 is essentially a rectangular plate structure having one side thereof provided with two mounting rails 12. The mounting rails are substantially L-shaped strips respectively consisting of a longitudinal portion and a transverse portion which extends integrally from the mounting plate 1. The mounting rails 12 are oppositely disposed in an parallel relationship such that a gap 12 is defined between the vertical portions thereof and a mounting track 13 is formed between the transverse portions thereof. A stop lug 14 is provided at one end of gaps 12 to baffle the fastening plate 2 after it is mounted onto the mounting plate 1. Likewise, two substantially L-shaped elongated fastening strips 15 with longitudinal portions and transverse portions are oppositely disposed on the other side of the mounting plate 1 forming a track 16 between the transverse portions thereof. Besides, a stop projection 17 is provided at one end of the two fastening strips 15 to baffle the mounting frame 3 inserted in the track 16.

The fastening plate 2 is also a plate-like structure made of flexible material and is configured to be slightly curved. The fastening plate 2 has a curved portion 21 at an upper end thereof and a raised portion 22 at a lower end thereof. Adjacent to the curved portion 21 is integrally provided a substantially T-shaped fastening rib consisting of a transverse rib portion 23 integrally extended from the fastening plate 2 and a longitudinal rib portion 24. The thickness of the transverse rib portion 23 matches the width of the gap 12, while the thickness of the longitudinal rib portion 24 corresponds to the width of the mounting track 13.

The mounting frame 3 mainly consists of a frame 31 with a hole 32 having a size corresponding to that of a fastening piece of a mobile phone jacket. On a rear side of the frame 31 is integrally provided a circular post 33 of a relatively smaller diameter, which is further integrally connected to a circular plate 34 of a relatively larger diameter. The diameter of the circular plate 34 corresponds to the distance between the transverse portions of the elongated fastening strips 15, i.e., the width of the track 16 so that the circular plate 34 may be inserted into the track 16. Hence, the thickness of the circular plate 34 should also match the height of the track 16. As for the height of the circular post 33, it should match that of the fastening strip 15.

Figure 2:
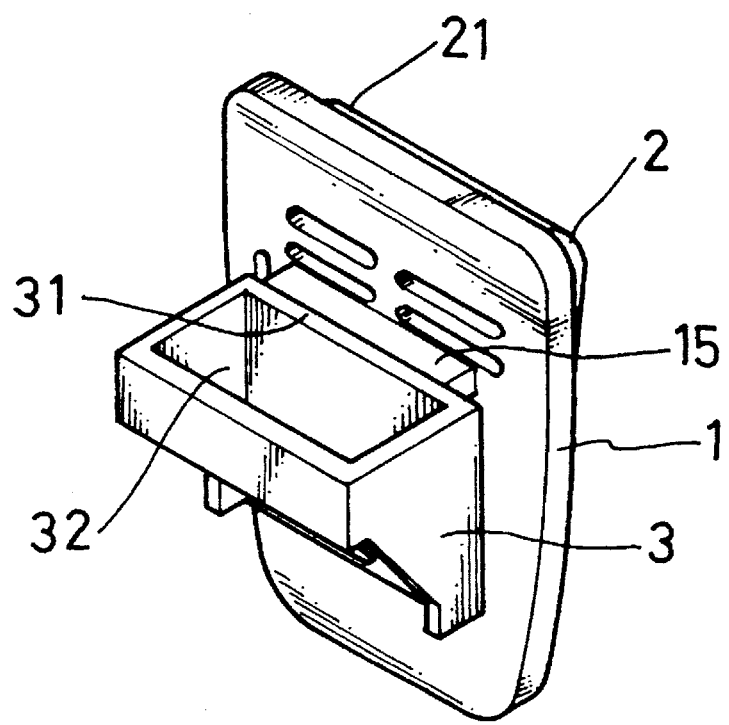
FIG. 2 is an elevational schematic view of the fastening device according to the present invention in an assembled state.

With reference to FIG. 2 which shows the fastening device according to the present invention in an assembled state, the longitudinal rib portion 24 of the fastening plate 2 is inserted into the mounting track 13 of the mounting plate 1 and is pushed to an extreme end until it is baffled by the stop lug 14 so that it is positioned. The circular plate 34 of the mounting frame 3 is then fitted into the track 16 of the mounting plate 1 and is also pushed to an extreme end until it is checked by the stop projection 17 so that it is positioned. The mounting frame 3 is capable of turning relative to the mounting plate 1.

Figure 3:
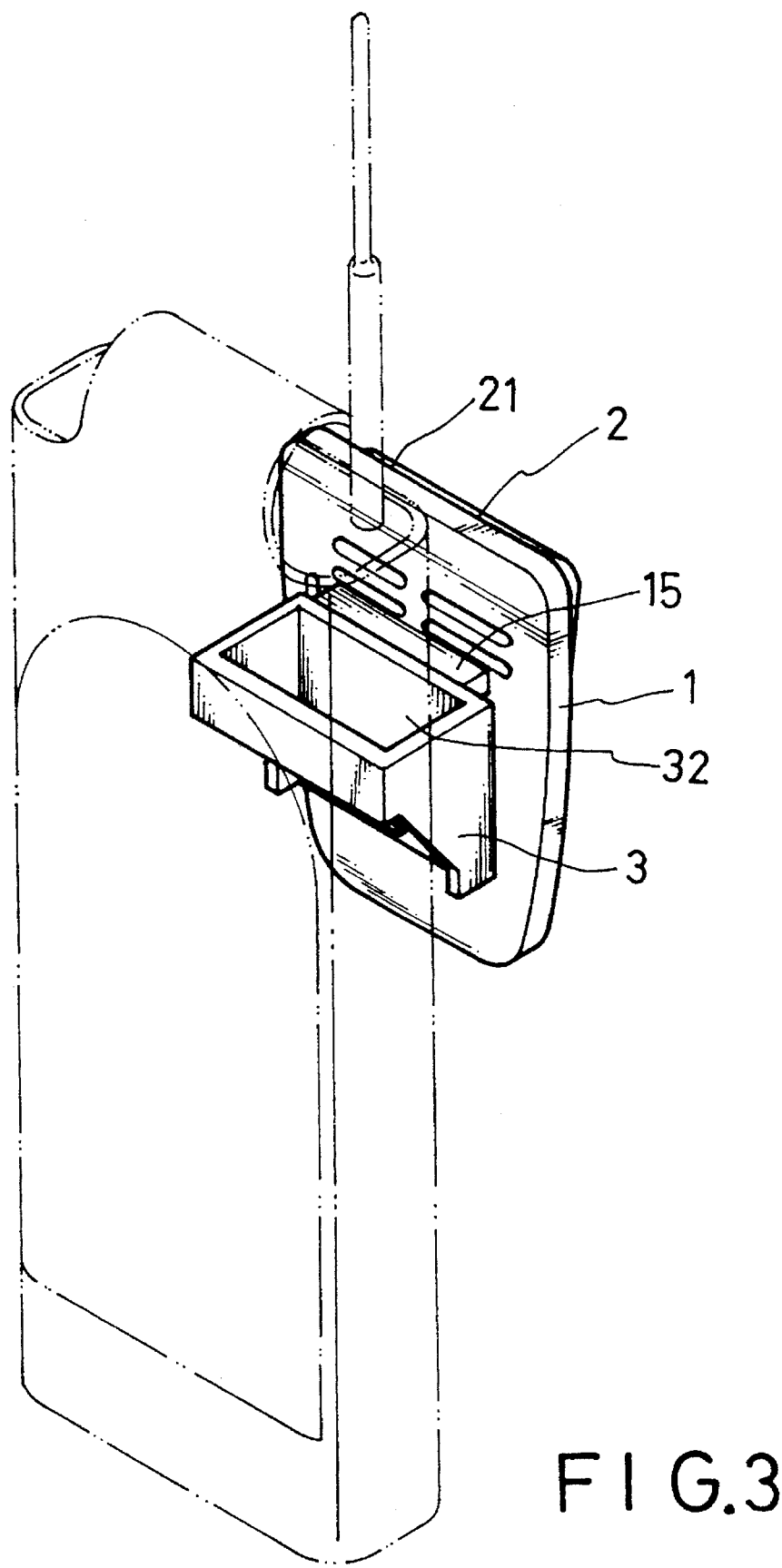
FIG. 3 is an elevational schematic view illustrating the fastening device of the present invention installed in a mobile phone jacket.

With reference to FIG. 3, in actual use, the user may fit the fastening plate 2 of the fastening device of the present invention onto his/her belt and pass a fastening piece of the mobile phone jacket through the hole 32 of the mounting frame 3. When the user is seated, the mounting frame 3 together with the mobile phone may be turned to a suitable position by means of the displacement of the circular plate 34 within the track 16 so that the mobile phone will not abut against the user's thigh or waist to cause discomfort to the user.

Although the present invention has been illustrated and described with reference to the preferred embodiment thereof, it should be understood that it is in no way limited to the details of such embodiment but is capable of numerous modifications within the scope of the appended claims.

What is claimed is:

1. A fastening device for a mobile phone, said fastening device comprising:

a mounting plate having one side thereof provided with two substantially L-shaped mounting rails extending integrally therefrom and being disposed in an opposite and parallel relationship thereon, said mounting rails respectively consisting of a longitudinal portion and a transverse portion, with a gap defined between the longitudinal portions thereof and a first mounting track defined between the transverse portions thereof, and two substantially L-shaped fastening strips being integrally provided and disposed on the other side of said mounting plate in a parallel relationship, defining a second track therebetween;

a fastening plate having first and second surfaces configured to have a slight curve and having a curved portion at an upper end thereof curving toward one of said surfaces and a raised portion at a lower end thereof on said one surface, and a substantially T-shaped fastening rib disposed on said one surface adjacent to said curved portion, said fastening rib consisting of a transverse rib portion integrally extended from said fastening plate and a longitudinal rib portion, said transverse rib portion having a thickness matching a width of said gap of said mounting plate and said longitudinal rib portion having a thickness matching a width of said mounting track of said mounting plate; and a mounting frame consisting of a frame with a through hole, a circular post having a diameter integrally extending from a rear side of said frame and being integrally connected to a circular plate of a larger than said post diameter, the diameter of said circular plate matching a distance between said fastening strips of said mounting plate with a height thereof matching that of said track between said fastening strips, and said circular post having a height matching that of said fastening strips;

said longitudinal rib portion of said fastening plate being inserted into said first mounting track of said mounting plate and said circular plate of said mounting frame being inserted into said second track between said fastening strips of said mounting plate so as to be positioned, wherein a user's belt is adapted to be positioned between said mounting plate and said fastening plate and said mounting frame may turn relative to said mounting plate.

2. A fastening device for a mobile phones according to claim 1, wherein a stop lug is provided at one end of said gap of said mounting plate to baffle said T-shaped fastening rib inserted into said mounting track and a stop projection is provided at one end of said fastening strips of said mounting plate to baffle said circular plate of said mounting frame inserted into said second track.

* * * * *